US007554679B2

(12) United States Patent
Une et al.

(10) Patent No.: US 7,554,679 B2
(45) Date of Patent: Jun. 30, 2009

(54) IMAGE FORMING APPARATUS, IMAGE FORMING METHOD, AND IMAGE FORMING PROGRAM

(75) Inventors: Kiyoshi Une, Saitama (JP); Koichiro Mino, Saitama (JP); Takao Hasegawa, Saitama (JP); Taro Seki, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 882 days.

(21) Appl. No.: 10/948,196

(22) Filed: Sep. 24, 2004

(65) Prior Publication Data

US 2005/0264830 A1 Dec. 1, 2005

(30) Foreign Application Priority Data

Jun. 1, 2004 (JP) ............................ 2004-163176

(51) Int. Cl.

| | |
|---|---|
| ***G06F 3/12*** | (2006.01) |
| ***G06F 17/28*** | (2006.01) |
| ***G06F 17/20*** | (2006.01) |
| ***G06F 3/00*** | (2006.01) |
| ***G06F 3/048*** | (2006.01) |
| ***G06F 13/048*** | (2006.01) |
| ***G09G 5/00*** | (2006.01) |
| ***G03G 15/00*** | (2006.01) |
| ***G10L 21/00*** | (2006.01) |

(52) U.S. Cl. ....................... 358/1.1; 358/1.13; 345/689; 399/81; 704/2; 704/8; 704/277; 715/703; 715/810; 715/835; 715/866

(58) Field of Classification Search ................ 358/1.15, 358/1.1, 1.13; 709/206, 230; 710/14
See application file for complete search history.

(56) References Cited

U.S. PATENT DOCUMENTS

| | | | | |
|---|---|---|---|---|
| 5,182,796 | A | 1/1993 | Shibayama et al. | |
| 7,130,069 | B1 * | 10/2006 | Honma | 358/1.15 |
| 7,185,289 | B1 * | 2/2007 | Taima | 715/810 |

(Continued)

FOREIGN PATENT DOCUMENTS

JP A 9-152946 6/1997

(Continued)

OTHER PUBLICATIONS

RD 460044 Reserch Disclosure Database No. 460044: Multi-language printer control panel; Published in Aug. 2002.*

*Primary Examiner*—Mark K Zimmerman
*Assistant Examiner*—Mesfin Getaneh
(74) *Attorney, Agent, or Firm*—Oliff & Berridge, PLC

(57) ABSTRACT

An image forming apparatus having a display unit which displays system information and job information on such as a job execution state, comprising: a storage unit which stores in plural kinds of languages the job information displayed on the display unit; a job storage unit which stores plural jobs being executed and on standby; a language type extracting unit which extracts language types registered in the jobs from the jobs stored in the job storage unit; and a display control unit which acquires from the storage unit the job information in a language matching the language type extracted by the language type extracting unit, and displays on the display unit the job information on the job stored in the job storage unit by using the acquired display information.

11 Claims, 10 Drawing Sheets

U.S. PATENT DOCUMENTS

| | | | | |
|---|---|---|---|---|
| 2002/0154154 | A1* | 10/2002 | Cornelius | 345/705 |
| 2003/0133041 | A1* | 7/2003 | Curtis et al. | 348/462 |
| 2004/0179229 | A1* | 9/2004 | Laughlin | 358/1.15 |
| 2004/0246505 | A1* | 12/2004 | Oh | 358/1.1 |

FOREIGN PATENT DOCUMENTS

| | | | |
|---|---|---|---|
| JP | A 11-105379 | | 4/1999 |
| JP | 2003-209643 | | 7/2003 |
| JP | 2003271286 A | * | 9/2003 |
| JP | 2004050701 A | * | 2/2004 |

* cited by examiner

IMAGE FORMING APPARATUS, IMAGE FORMING METHOD, AND IMAGE FORMING PROGRAM

BACKGROUND OF THE INVENTION

1. Field of the Invention

The present invention relates to an image forming apparatus, an image forming method, and an image forming program for displaying job information on a control panel, and more particularly to an image forming apparatus, an image forming method, and an image forming program which make it possible to display job information on a control panel in a language corresponding to a job.

2. Description of the Related Art

Conventionally, a control panel of a printer or the like has been able to display in only one predetermined language. For this reason, there has been a problem in that in cases where a person who speaks a different mother tongue or a person on a business trip from abroad is present in an office, even if a printer undergoes a paper jam or the like and an error message is displayed on a control panel, such a person is unable to understand the content of the message.

In connection with the above-described problem, an "image forming apparatus" is disclosed in Japanese Patent Application Laid-Open No. 09-152946 concerning a technique for changing over the language displayed on the control panel.

In the invention of this Japanese Patent Application Laid-Open No. 09-152946, the state of a print job which is displayed on the control panel can be displayed in a language corresponding to the respective print job, so that the operator is able to easily read the content being displayed.

However, the invention of this Japanese Patent Application Laid-Open No. 09-152946 is for allowing an operator who registered the print job to discriminate error information and the like, and no consideration is given to the other operators who use the image forming apparatus. Hence, there has been a problem in that when an error has occurred, only the operator who registered the print job which caused the error can cope with the error.

SUMMARY OF THE INVENTION

In view of the above-described circumstances, it is an object of the present invention to provide an image forming apparatus, an image forming method, and an image forming program which make it possible to display job information on the control panel in a language corresponding to the job.

To achieve the above-mentioned object, an aspect of the present invention provides an image forming apparatus having a display unit which displays system information and job information on such as a job execution state, comprising: a storage unit which stores in plural kinds of languages the job information displayed on the display unit; a job storage unit which stores plural jobs being executed and on standby; a language type extracting unit which extracts language types registered in the jobs from the jobs stored in the job storage unit; and a display control unit which acquires from the storage unit the job information in languages matching the language types extracted by the language type extracting unit, and displays on the display unit the job information on the job stored in the job storage unit by using the acquired display information.

Another aspect of the present invention provides an image forming method for displaying on a display unit system information and job information on such as a job execution state, comprising: storing in plural kinds of languages in a storage unit the job information displayed on the display unit; storing in a job storage unit plural jobs being executed and on standby; extracting by a language type extracting unit language types registered in the jobs from the jobs stored in the job storage unit; and acquiring from the storage unit the job information in languages matching the language types extracted by the language type extracting unit, and displaying on the display unit by a display control unit the job information on the job stored in the job storage unit by using the acquired display information.

Still another aspect of the present invention provides an image forming program which is executed by a computer having a display unit which displays system information and job information on such as a job execution state, comprising: a step of storing in plural kinds of languages in a storage unit the job information displayed on the display unit; a step of storing in a job storage unit plural jobs being executed and on standby; a step of extracting by a language type extracting unit language types registered in the jobs from the jobs stored in the job storage unit; and a step of acquiring from the storage unit the job information in languages matching the language types extracted by the language type extracting unit, and displaying on the display unit the job information on the job stored in the job storage unit by using the acquired display information.

According to the present invention, the arrangement provided is such that job information can be displayed by using plural kinds of languages (messages) in correspondence with the print jobs stored in the image forming apparatus. Therefore, an advantage is offered in that all the users who use the image forming apparatus (who use different mother tongues) are able to easily recognize the job information, so that convenience is enhanced.

BRIEF DESCRIPTION OF THE DRAWINGS

Embodiments of the present invention will be described in detail based on the following figures, wherein.

DETAILED DESCRIPTION OF THE INVENTION

Referring now to the accompanying drawings, a detailed description will be given of the embodiments of an image forming apparatus, an image forming method, and an image forming program in accordance with the present invention.

Figure 1:
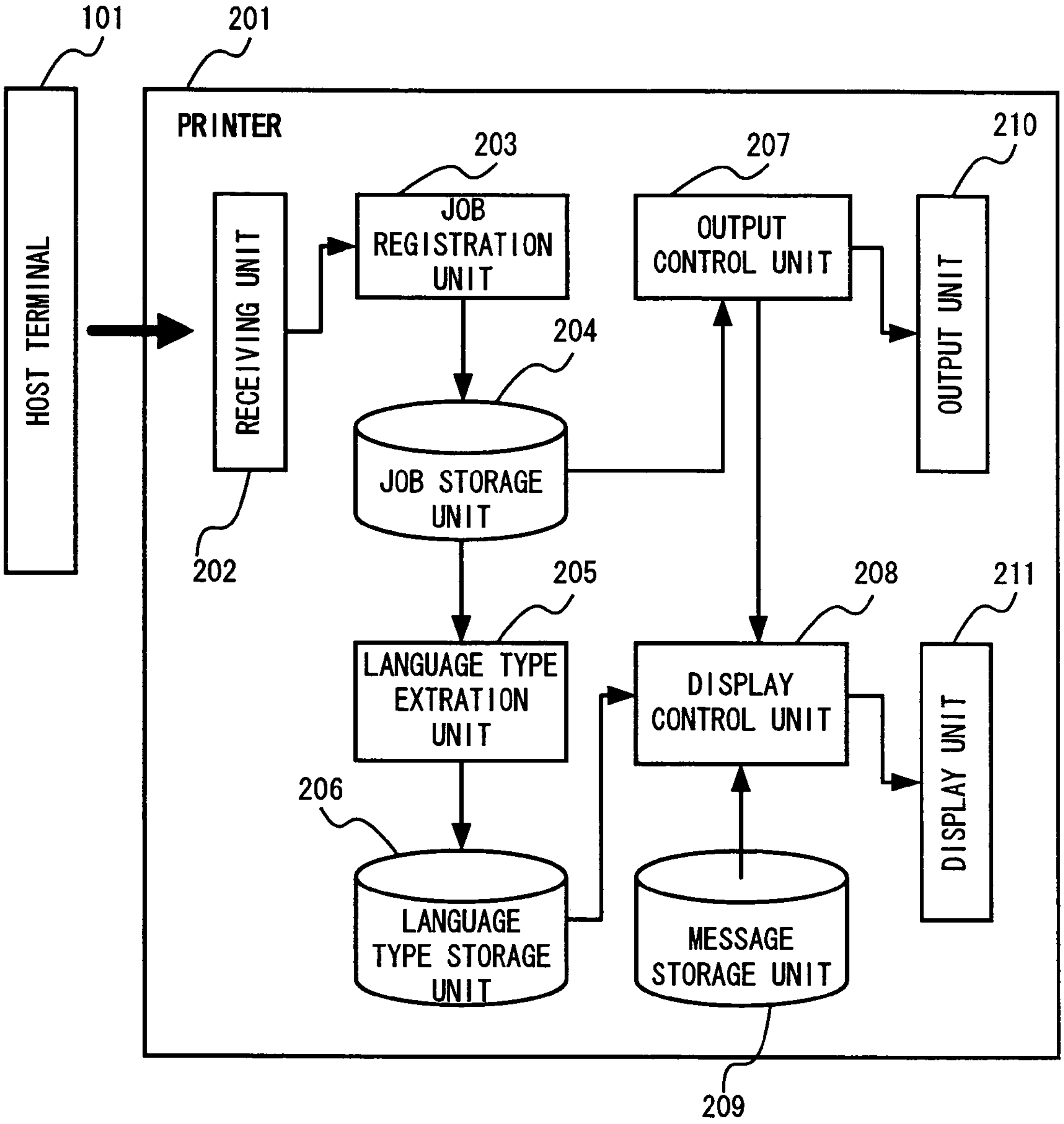
FIG. 1 is a block diagram explaining the configuration of a printer 201 in accordance with the invention.

FIG. 1 is a block diagram explaining the configuration of a printer 201 to which an image forming method in accordance with the invention is applied. Insofar as the function of the invention is executed, the present invention is applicable to a single unit apparatus, a system consisting of plural apparatuses, or a system in which connection is established through a network such as LAN (Local Area Network), WAN (Wide Area Network), or the like to effect processing.

The drawing shows a host terminal 101 and a printer 201, and the printer 201 is connected to the host terminal 101.

The host terminal 101 is a personal computer or the like which is operated by a user, and the host terminal 101 transmits a print request to the printer 201 when the user instructs printing. When the print request is transmitted from the host terminal 101 to the printer 201, the print request is transmitted by adding a language type thereto.

The printer 201 has a display unit such as a control panel installed thereon. When the printer 201 receives the print request from the host terminal 101, the printer 201 extracts the language type added to the print request, and displays job information on a display unit 211, which will be described later, by using a language corresponding to the extracted language type.

The printer 201 is configured by including therein a receiving unit 202, a job registration unit 203, a job storage unit 204, a language type extracting unit 205, a language type storage unit 206, an output control unit 207, a display control unit 208, a message storage unit 209, an output unit 210, and a display unit 211.

The receiving unit 202 is a processing unit for receiving a print request from the host terminal 101, and is specifically an interface for connecting the host terminal 101 and the printer 201.

The job registration unit 203 causes the print request received by the receiving unit 202 from the host terminal 101 to be registered in the job storage unit 204 as a print job.

The language type extracting unit 205 extracts the language type added to the print job registered in the job storage unit 204 by the job registration unit 203, and stores that language type in the language type storage unit 206.

The output control unit 207 effects the print processing of the print job stored in the job storage unit 204, while controlling the operation of the output unit 210.

The display control unit 208 reads from the message storage unit 209 language information (message) matching the language type stored in the language type storage unit 206, and displays it on the display unit 211.

The message storage unit 209 stores in plural types of languages messages for displaying the job information.

Here, referring to FIG. 1, a description will be given of a series of flow with respect to the image forming method of the invention using the printer 201.

When a print request with a language type added thereto is transmitted from the host terminal 101 to the printer 201, the printer 201 receives the print request by means of the receiving unit 202, and registers (stores) in the job storage unit 204 the print request as a print job by means of the job registration unit 203. The language type extracting unit 205 extracts the language type from the print job registered in the job storage unit 204, and stores that language type in the language type storage unit 206. Then, the output control unit 207 controls the output control unit 210 to start the output processing of that print job. At that time, the display control unit 208 reads from the message storage unit 209 a message corresponding to the language type stored in the language type storage unit 206, and displays it on the display unit 211.

Next, referring to FIGS. 2, 3, and 4, a description will be given of display modes of messages displayed on the display unit 211 of the printer 201 described with reference to FIG. 1.

Figure 2:
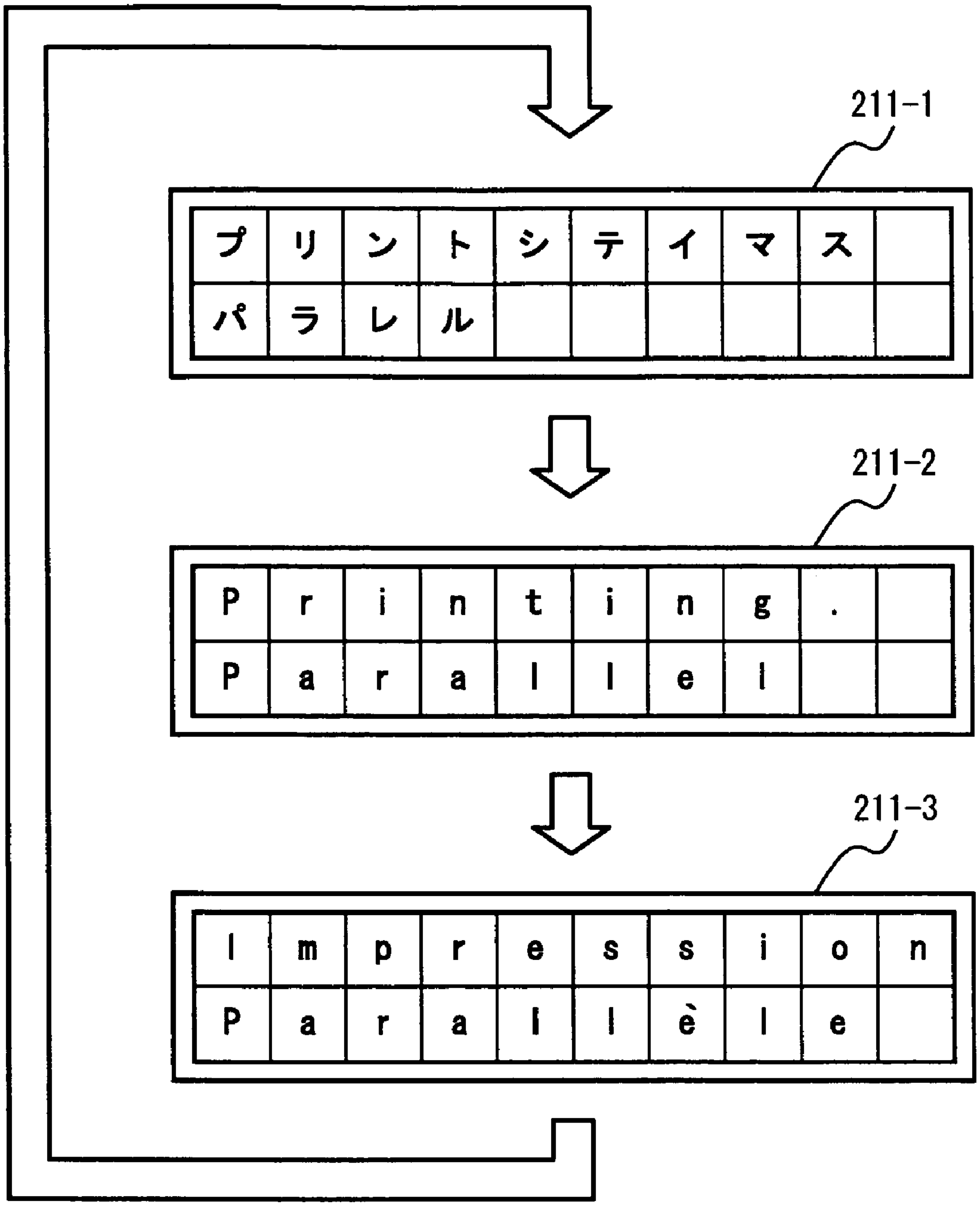
FIG. 2 is a diagram illustrating an example of a display unit 211 installed in the printer 201 shown in FIG. 1.

FIG. 2 shows an example of the display unit 211 whose screen is small and which is incapable of displaying plural languages simultaneously.

In the drawing, a mode is shown in which job information is displayed on the display unit 211 by using three kinds of languages. Here, messages which are displayed in Japanese (display portion 211-1), English (display portion 211-2), and French (display portion 211-3) are displayed by being changed over in fixed time periods. In the case of such a compact display unit 211, the user is informed of the job information by consecutively changing over the screen (language).

It should be noted that, as a method of display by changing over the screen, the display may be given by automatically changing over the screen, or the screen may be changed over by pressing an unillustrated changeover button.

Figure 3:
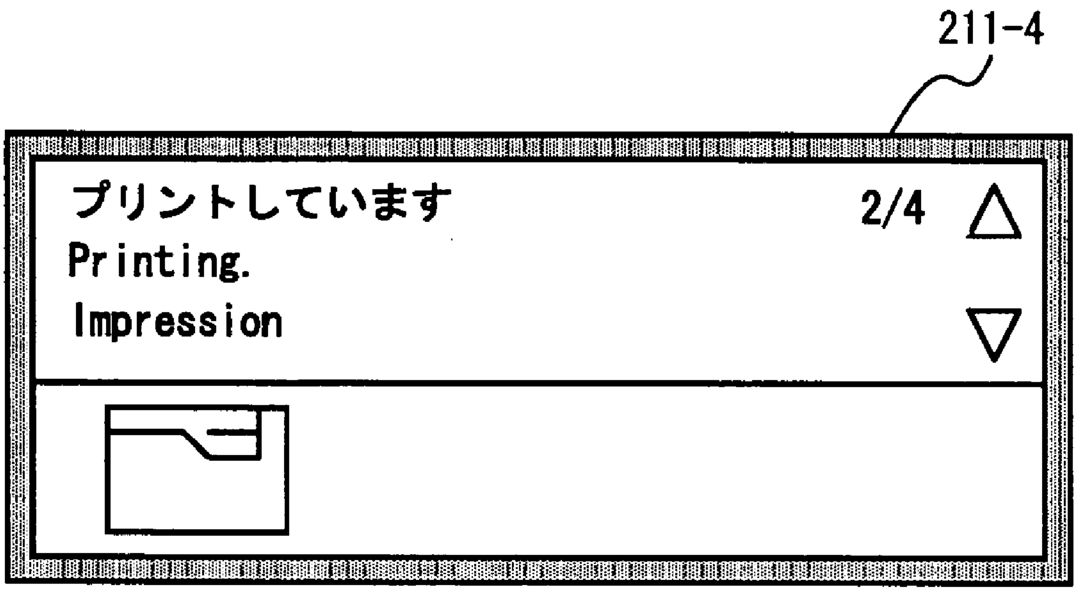
FIG. 3 is a diagram illustrating an example of the display unit 211 installed in the printer 201 shown in FIG. 1.

In addition, FIG. 3 shows an example of the display unit 211 whose screen is sufficiently large and which is capable of displaying plural languages simultaneously.

In the drawing, a mode is shown in which job information is displayed on the display unit 211 by using three kinds of languages. Here, messages which are displayed in Japanese, English, and French are displayed simultaneously. In the case of such a display unit 211-4 having a sufficiently large size, the user is informed of the job information by simultaneously displaying the three kinds of languages.

Figure 4:
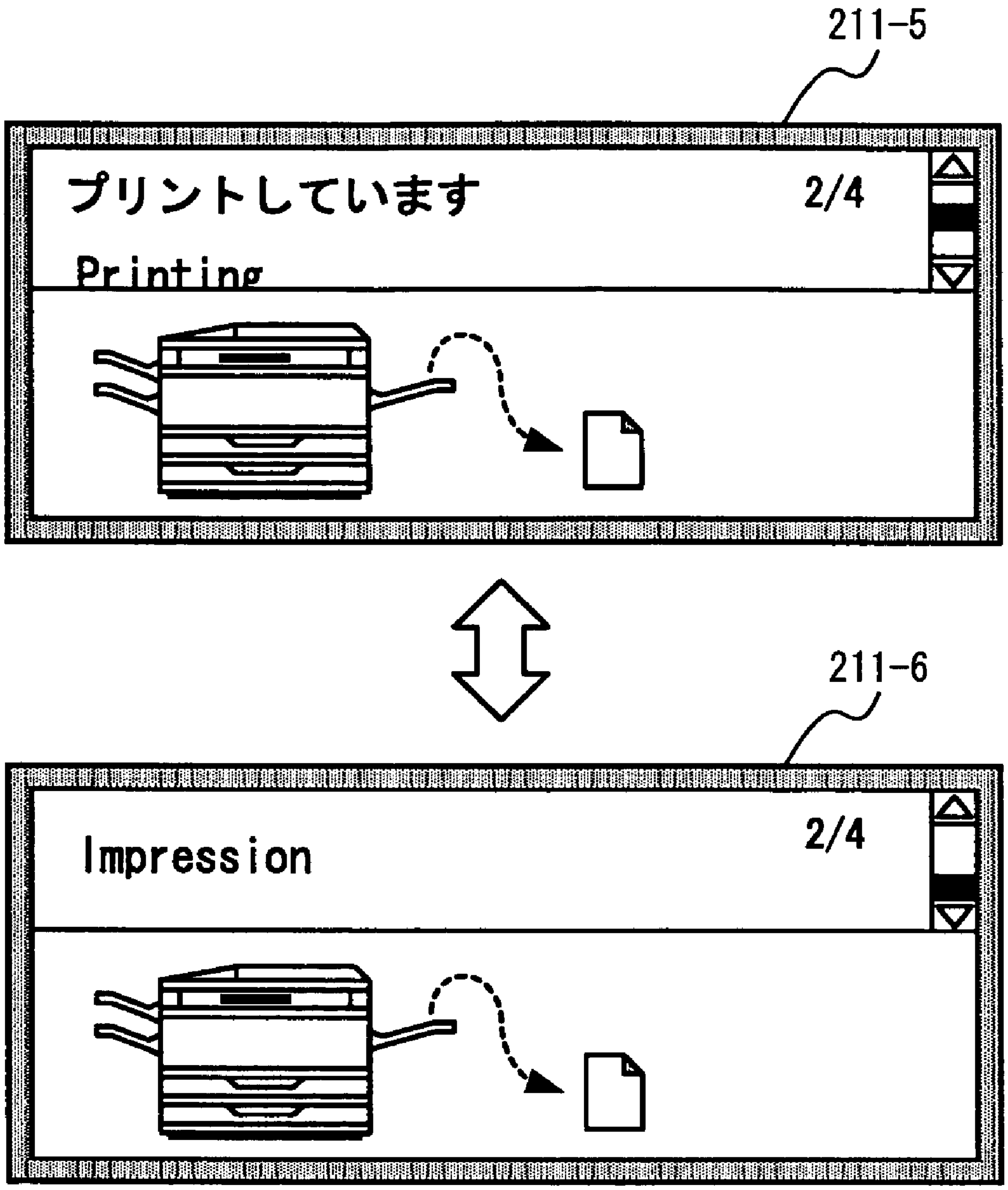
FIG. 4 is a diagram illustrating an example of the display unit 211 installed in the printer 201 shown in FIG. 1.

In addition, FIG. 4 shows an example of the display unit 211 in which a message display area within the screen of the display unit 211 is not sufficiently large and which is incapable of displaying plural languages simultaneously.

In the drawing, a mode is shown in which job information is displayed on the display unit 211 by using three kinds of languages. Here, messages which are displayed in Japanese, English, and French are displayed so as to be capable of being recognized by scrolling them (from a display portion 211-5 to a display portion 211-6). In the case where a sufficient area thus cannot be secured in the message display area, the user is informed of the job information by making the screen scrollable to display three kinds of languages.

As described above, in the present invention, even in cases where the display unit 211 installed on the printer 201 is small and it is difficult to simultaneously display the job information by using plural kinds of languages, it is possible to accurately display the job information by using plural kinds of languages by such as consecutively changing over the screen.

Figure 5:
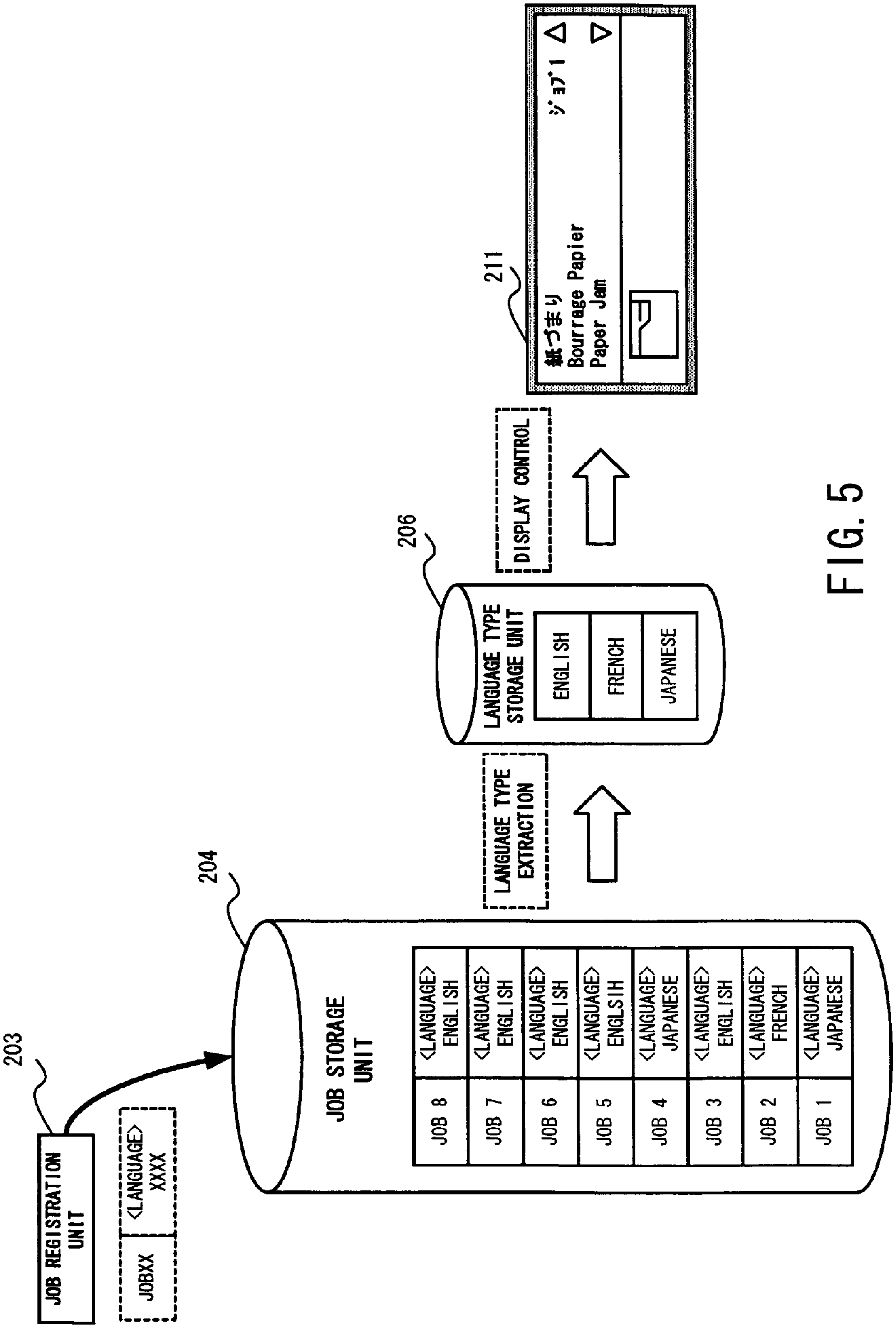
FIG. 5 is a schematic diagram explaining the relationship between a print job and a display mode of messages displayed on the display unit 211.

Next, referring to FIG. 5, a description will be given of the relationship between a print job and a display mode of messages displayed on the display unit 211.

The drawing shows a schematic diagram explaining processing in which language types are extracted from the print jobs stored in the job storage unit 204, and the display control unit 208 displays the job information on the display unit 211 on the basis of the extracted language types.

First, print jobs are registered in the job storage unit 204 by the job registration unit 203. Here, as for the print jobs which have been registered, the one which was registered first (the oldest one) is a job 1 (Japanese (language type)), the one which was registered next is a job 2 (French (language type)), the one which was registered next is a job 3 (English (language type)), . . . , and the one which was registered last is a job 8 (English (language type)). Print jobs which have been respectively prepared in Japanese, English, and French are present in mixed form in this job storage unit 204.

As for the print jobs (job 1 to job 8) registered in the job storage unit 204, it can be seen that their language types have been extracted by the language type extracting unit 205, and that "English," "French," and "Japanese" are stored in the language type storage unit 206.

The job information on the job 1 is displayed on the display unit 211, in which case messages are displayed by the language types "Japanese," "French," and "English" stored in the language type storage unit 206. This is done as the display control unit 208 extracts from the message storage unit 209 the language types stored in the language type storage unit 206 and the language information corresponding to those language types, and displays them on the display unit 211. Here, messages meaning "paper jam" are displayed in Japanese, French, and English, respectively.

As described above, in the present invention, a language type is extracted from the print job stored in the printer 201, and in a case where plural language types have been consequently extracted, job information is displayed on the display unit 211 by using the plural languages. Therefore, all the users who use the printer 201 (who use different mother tongues) are able to easily recognize the job information, so that convenience is enhanced.

Figure 6:
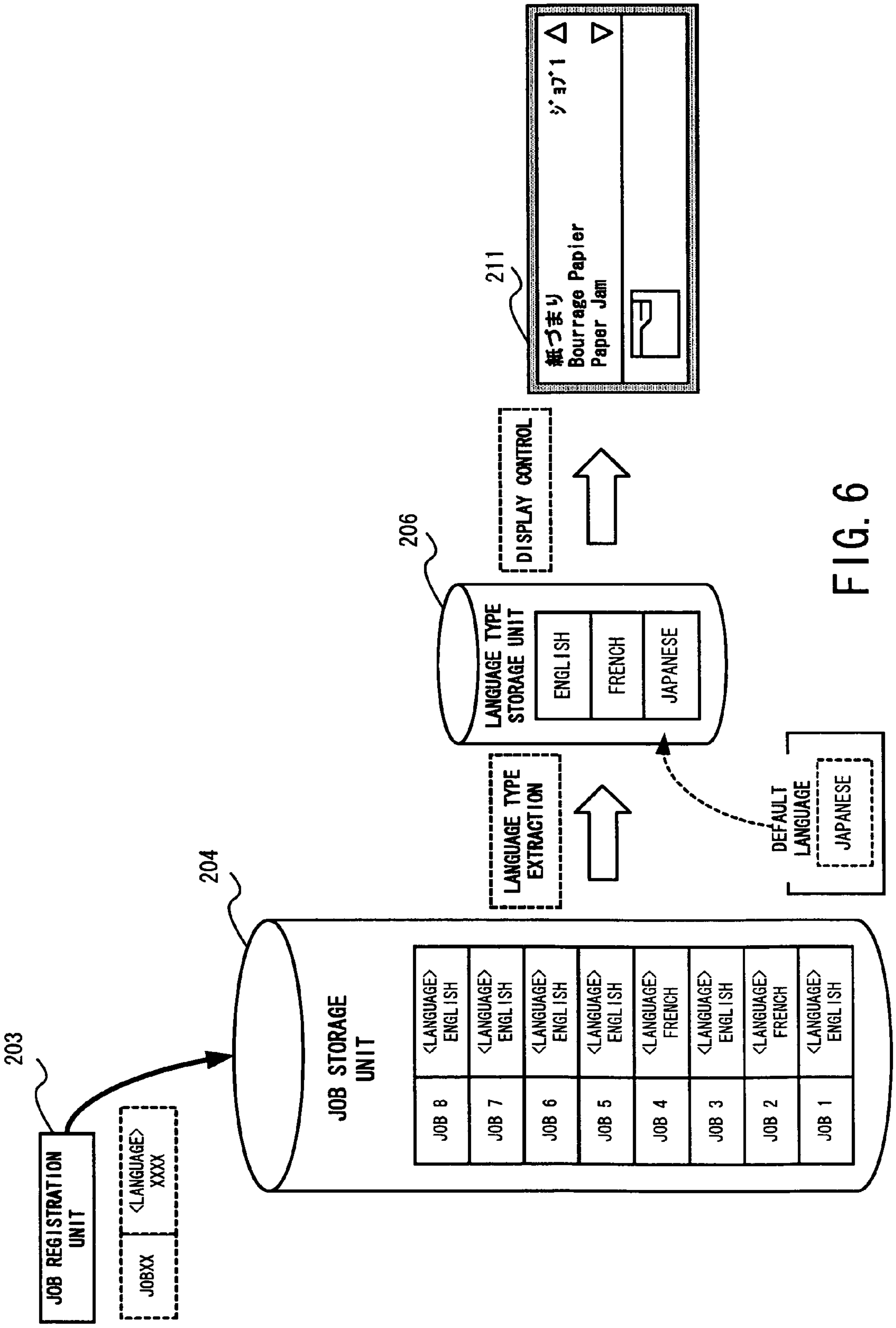
FIG. 6 is a schematic diagram explaining the relationship (default language) between the print job and a display mode of messages displayed on the display unit 211.

Next, referring to FIG. 6, a description will be given of the relationship between the print job and the display mode of messages displayed on the display unit 211 in a case where a default language has been set in the printer 201. It should be noted that a description will be given herein of a case where Japanese has been set in advance in the language type storage unit 206 of the printer 201 as the default language.

The drawing shows a schematic diagram explaining processing in which the language types are extracted from the print jobs stored in the job storage unit 204, and the display control unit 208 displays the job information on the display unit 211 on the basis of the extracted language types.

First, print jobs are registered in the job storage unit 204 by the job registration unit 203. Here, as for the print jobs which have been registered, the one which was registered first (the oldest one) is a job 1 (English (language type)), the one which was registered next is a job 2 (French (language type)), the one which was registered next is a job 3 (English (language type)), . . . , and the one which was registered last is a job 8 (English (language type)). Print jobs which have been respectively prepared in English and French are present in mixed form in this job storage unit 204.

As for the print jobs (job 1 to job 8) registered in the job storage unit 204, their language types are extracted by the language type extracting unit 205, and "English" and "French" are stored in the language type storage unit 206. In addition, since "Japanese" has been set as the default language, "French," "English," and "Japanese" are stored in the language type storage unit 206.

The job information on the job 1 is displayed on the display unit 211, in which case messages are displayed by the language types "Japanese," "French," and "English" stored in the language type storage unit 206. This is done as the display control unit 208 extracts from the message storage unit 209 the language types stored in the language type storage unit 206 and the language information corresponding to those language types, and displays them on the display unit 211. Here, messages meaning "paper jam" are displayed in Japanese, French, and English, respectively.

As described above, in the present invention, the job information is displayed by the language type corresponding to the print job stored in the printer 201, and additionally the user may set the default language in advance, and give the display in the default language.

Next, referring to FIGS. 7 and 8, a description will be given of the relationship between the print job and the messages displayed on the display unit 211 in a case where plural kinds of languages grouped and registered in the printer 201.

It should be noted that the term "grouping" refers to the registering of plural kinds of languages collectively as one group, and the setting of a representative language serving as a representative of the group. In a case where print jobs with the language type belonging to that group added thereto are stored in the language type storage unit 206, the job information corresponding to those print jobs is displayed in the language which has been set as the representative language.

Figure 7:
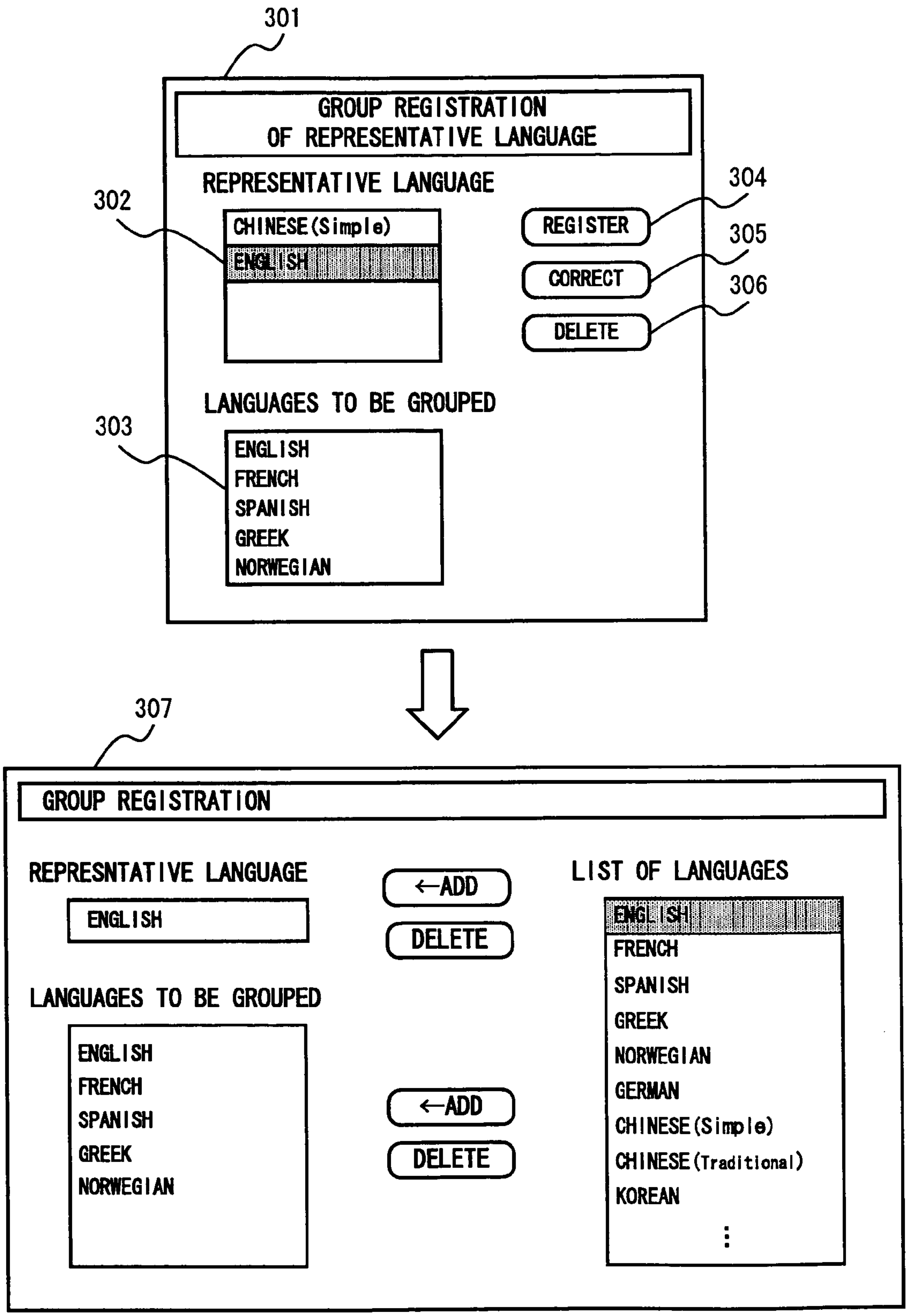
FIG. 7 is a diagram illustrating a screen layout used at the time of grouped setting.

FIG. 7 shows examples of a "group registration screen of a representative language" 301 and a "group registration screen" 307 which are used at the time of grouping registration.

The "group registration screen of a representative language" 301 is a screen which is configured by including a "languages to be grouped" 303, i.e., a region for representing languages which have been grouped; a "representative language" 302, i.e., a region for displaying a representative language of the grouped languages; and a "register button" 304, a "correct button" 305, and a "delete button" 306 for effecting the registration, changing, and deletion of set conditions. If any one of the "register button" 304 and the "correct button" 305 is pressed, the screen shifts to the "group registration screen" 307. It can be seen that, in the "group registration screen of a representative language" 301, English, French, Spanish, Greek, and Norwegian have been set in the "languages to be grouped" 303, and that English has been set in the "representative language" 302 as their representative language.

In the "group registration screen" 307, it is possible to effect the change and the like of the set conditions of the grouping and the representative language.

Figure 8:
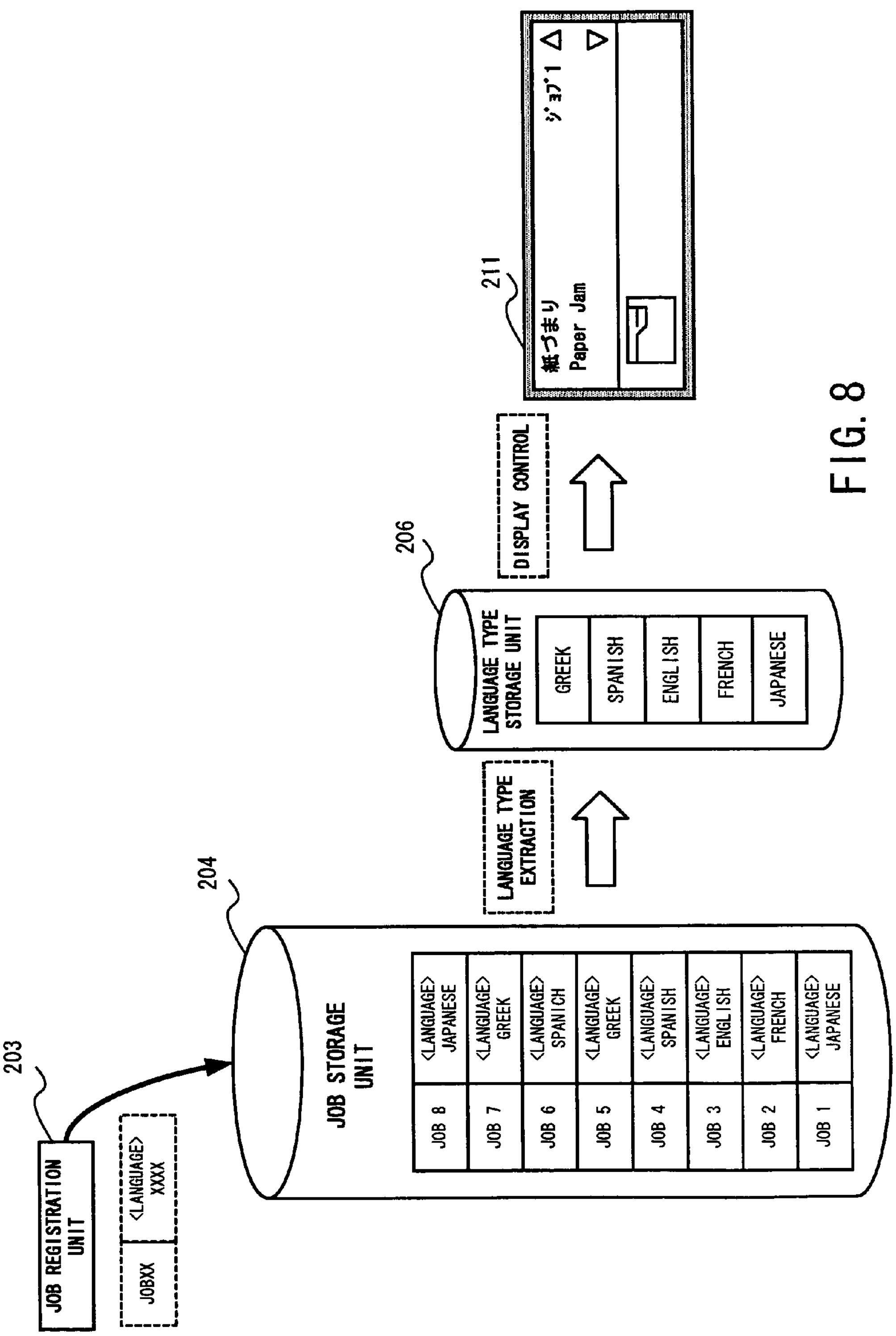
FIG. 8 is a schematic diagram explaining the relationship (grouped setting) between the print job and a display mode of messages displayed on the display unit 211.

FIG. 8 shows a schematic diagram explaining processing in which the language types are extracted from the print jobs stored in the job storage unit 204, and the display control unit 208 displays the job information on the display unit 211 on the basis of the extracted language types. It should be noted that a description will be given herein of a case in which English, French, Spanish, Greek, and Norwegian have been collectively registered as one group, and English has been set as the representative language.

First, print jobs are registered in the job storage unit 204 by the job registration unit 203. Here, as for the print jobs which have been registered, the one which was registered first (the oldest one) is a job 1 (Japanese (language type)), the one which was registered next is a job 2 (French (language type)), the one which was registered next is a job 3 (English (language type)), . . . , and the one which was registered last is a job 8 (English (language type)). Print jobs which have been respectively prepared in Japanese, French, English, Spanish, and Greek are present in mixed form in this job storage unit 204.

As for the print jobs (job 1 to job 8) registered in the job storage unit 204, it can be seen that their language types have been extracted by the language type extracting unit 205, and that "Greek," "Spanish," "English," "French," and "Japanese" are stored in the language type storage unit 206.

The job information on the job 1 is displayed on the display unit 211, in which case messages are displayed by the language types "Japanese" and "English" stored in the language type storage unit 206. This is because since Greek, Spanish, English, and French have been set in the grouped setting, the display control unit 208 provides control such that the display is given in English which has been set as the representative language of the group. Here, messages meaning "paper jam" are displayed in Japanese and English, respectively.

As described above, in the present invention, since plural kinds of languages can be grouped, and a representative language can be set among the plural kinds of languages grouped, it is possible to prevent a decline in visibility due to the fact that the kinds of the languages being displayed on the display unit 211 are excessively numerous.

Figure 9:
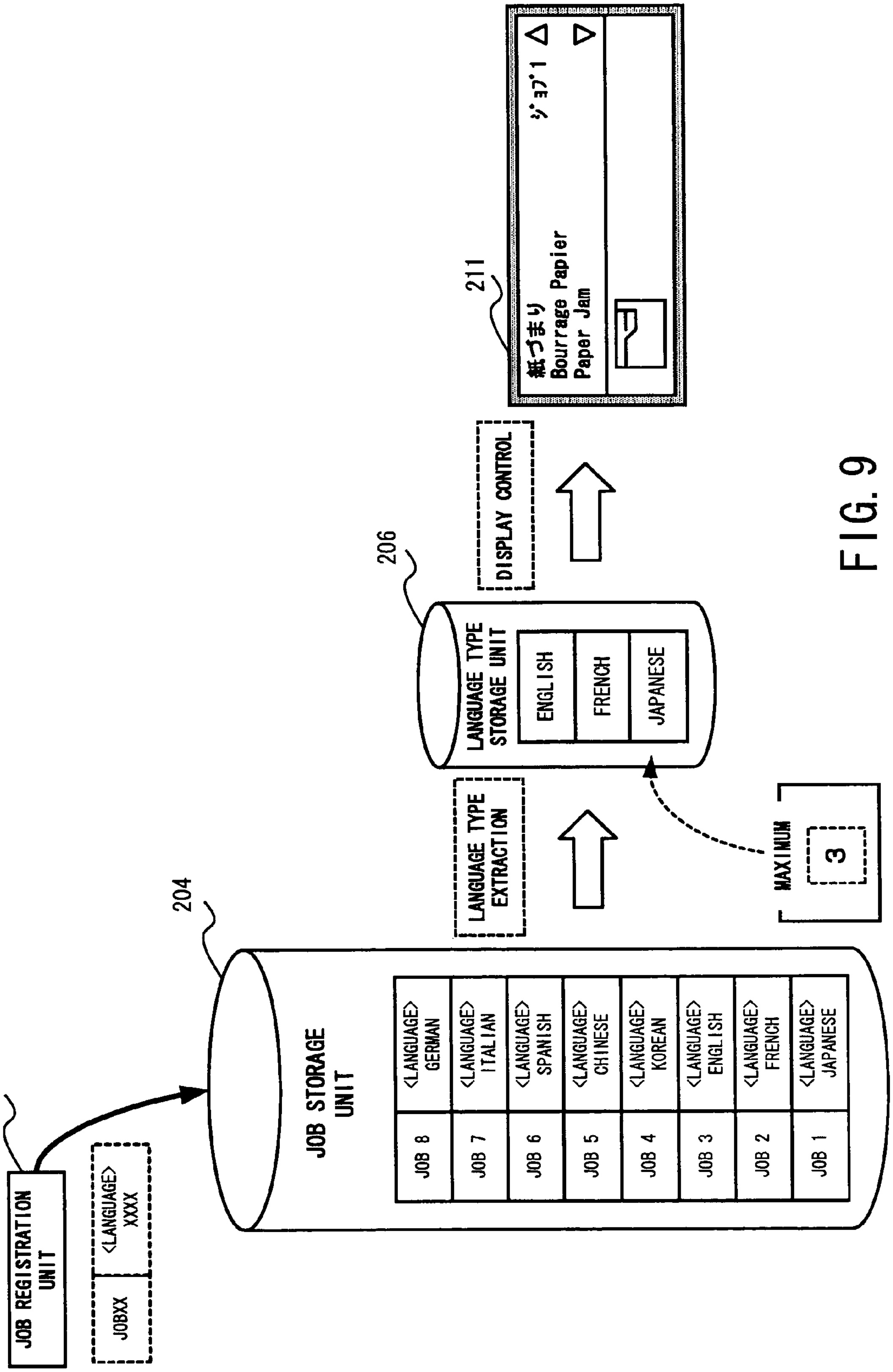
FIG. 9 is a schematic diagram explaining the relationship (maximum value) between the print job and a display mode of messages displayed on the display unit 211.

Next, referring to FIG. 9, a description will be given of the relationship between the print job and the display mode of messages displayed on the display unit 211 in a case where a maximum value of display languages has been set in the printer 201. It should be noted that a description will be given herein of a case where 3 has been set in advance in the language type storage unit 206 of the printer 201 as the maximum value of display languages.

The drawing shows a schematic diagram explaining processing in which the language types are extracted from the print jobs stored in the job storage unit 204, and the display control unit 208 displays the job information on the display unit 211 on the basis of the extracted language types.

First, print jobs are registered in the job storage unit 204 by the job registration unit 203. Here, as for the print jobs which have been registered, the one which was registered first (the oldest one) is a job 1 (Japanese (language type)), the one which was registered next is a job 2 (French (language type)), the one which was registered next is a job 3 (English (language type)), . . . , and the one which was registered last is a job 8 (German (language type)). Print jobs which have been respectively prepared in Japanese, French, English, Korean, Chinese, Spanish, Italian, and German are present in mixed form in this job storage unit 204.

As for the print jobs (job 1 to job 8) registered in the job storage unit 204, their language types are extracted by the language type extracting unit 205, and "English," "French," and "Japanese" are stored in the language type storage unit 206. This is to ensure that since the maximum value of display languages is set in advance to 3, three kinds of languages starting with the print job registered the earliest (first) among the print jobs stored in the job storage unit 204 are displayed on the display unit 211.

The job information on the job 1 is displayed on the display unit 211, in which case messages are displayed by the language types "Japanese," "French," and "English" stored in the language type storage unit 206. This is done as the display control unit 208 extracts from the message storage unit 209 the language types stored in the language type storage unit 206 and the language information corresponding to those language types, and displays them on the display unit 211. Here, messages meaning "paper jam" are displayed in Japanese, French, and English, respectively.

As described above, in the present invention, by providing the maximum value of display languages, even in the case where the kinds of the languages displayed on the display unit 211 is excessively numerous, a decline in visibility does not occur.

It should be noted that the grouped setting described with reference to FIGS. 7 and 8 and the maximum value described with reference to FIG. 9 may be executed in combination. In that case, in the case where the maximum value has been set to 3, and plural print jobs (three or more kinds of language types) have been stored in the job storage unit 204, the job information is displayed on the display unit 211 in the grouped representative language.

Figure 10:
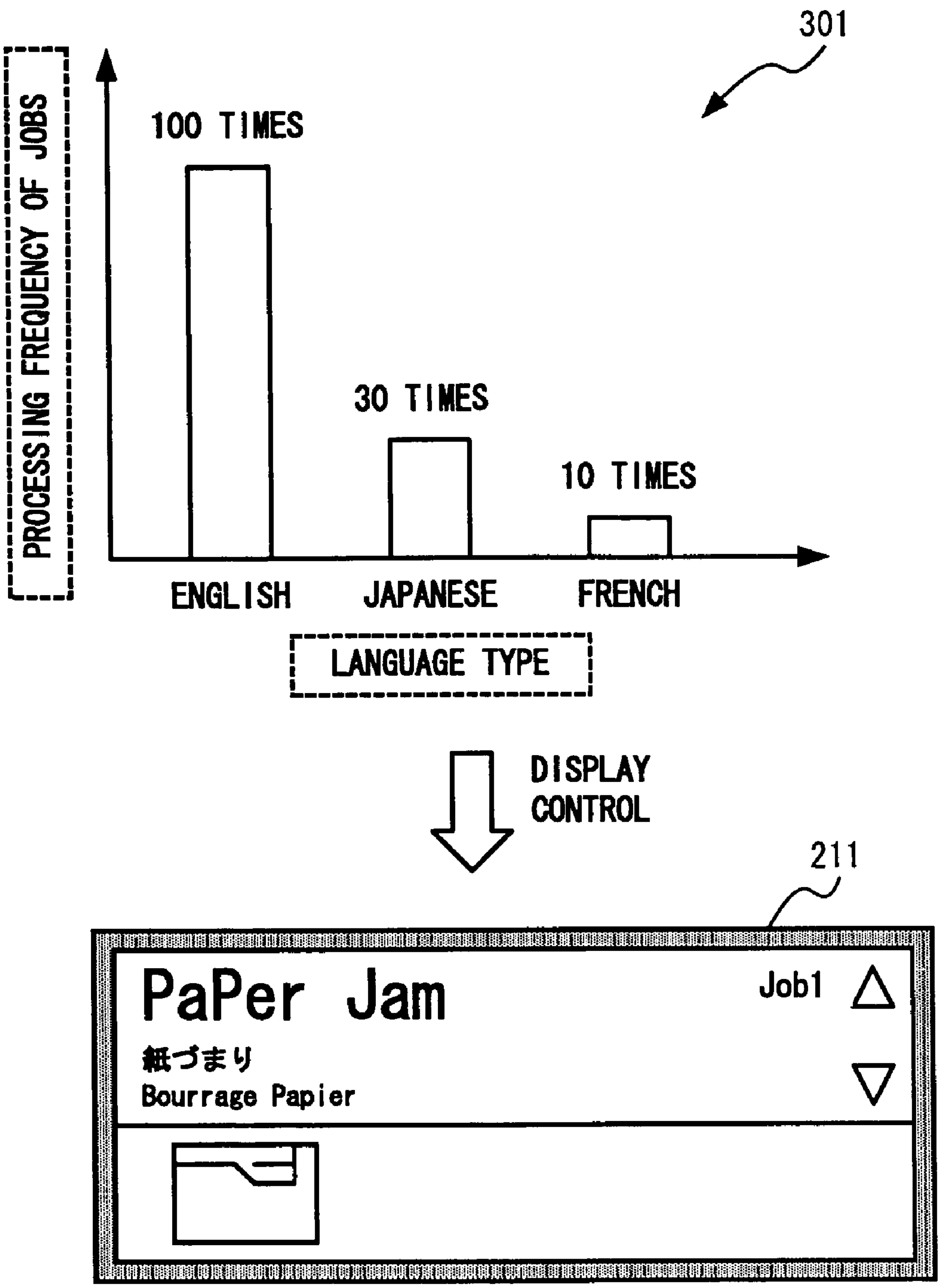
FIG. 10 is a schematic diagram explaining the relationship (statistics) between the print job and a display mode of messages displayed on the display unit 211.

Next, referring to FIG. 10, a description will be given of a display mode in which, from statistics of the language types of print jobs registered in the past in the printer 201, the display control unit 208 highlights a message displayed on the display unit 211 in accordance with the frequency of use.

The drawing shows a histogram 301 illustrating statistics of language types extracted in the past from the language type storage unit 206, as well as the display unit 211 displaying the job information by highlighting the message of the highest frequency of use in accordance with the statistics shown in the histogram 301.

The axis of ordinate of the histogram 301 shows the "processing frequency of jobs" indicating the number of times each language has been extracted, while the axis of abscissa shows the "language type." In addition, "English," "Japanese," and "French" have been set as the "language type," and if reference is made to the frequency of use of each "language type," "English" is 100 times, "Japanese" is 30 times, and "French" is 10 times.

From these statistics, it can be recognized that the frequency of use of "English" is the highest, followed by "Japanese" and "French" in the descending order of the frequency of use.

A display mode for highlighting the message in accordance with the frequencies of use of the languages shown by this histogram 301 is shown in the display unit 211.

The job information on the job 1 is displayed on the display unit 211, and it can be seen that the message displayed in "English" whose frequency of use was the highest is highlighted with a larger font size than the messages displayed in the other languages "Japanese" and "French." Further, the English message is displayed at the top in terms of its display position, and highlight is thus given in respect of the display order as well.

It should be noted that although a description has been given above of the method of highlighting in terms of both the font size and the display position, the present invention is not limited to the same, and highlight may be given only by the font size, or highlight may be given only by moving the display position to the top.

In addition, in a case where a message is highlighted in the display unit 211 whose screen is small and which is incapable of displaying plural languages simultaneously, highlight can be given by prolonging the display time of the language type whose frequency of use is high.

In addition, an arrangement may be provided such that even in a case where print jobs have not been stored in the job storage unit 204, system information is displayed on the display unit 211 by using the type of the display language registered in the past, on the basis of the statistics of the histogram 301 As described above, in the present invention, since the language types are extracted from the print jobs stored in the printer 201, and the frequencies of use of the language types are held as statistics, it is possible to highlight the language type whose use of frequency is high.

As described above, in the present invention, the arrangement provided is such that job information can be displayed by using plural kinds of languages (messages) in correspondence with the print jobs stored in the printer 201. Therefore, all the users who use the printer 201 (who use different mother tongues) are able to easily recognize the job information, so that convenience is enhanced.

It should be noted that although, in the above-described embodiments, the image forming method in accordance with the invention is arranged to be implemented by being applied to the printer. 201, this image forming processing may be arranged to be executed by an image forming program installed in the printer 201.

In addition, the present invention is not limited to the embodiments described above and illustrated in the drawings, and can be implemented by being modified appropriately within the scope that does not change its gist.

The image forming apparatus, the image forming method, and the image forming program in accordance with the invention are applicable to image forming apparatuses in general which display job information, and can be effectively utilized particularly in offices where a person who speaks a different mother tongue or a person on a business trip from abroad is present.

The entire disclosure of Japanese Patent Application No. 2004-163176 filed on Jun. 1, 2004 including specification, claims, drawings and abstract is incorporated herein by reference in its entirety.

What is claimed is:

1. An image forming apparatus, comprising:

a job storage unit which stores plural jobs being executed and on standby in association with languages used therefor;

an extracting unit which extracts languages associated with the jobs stored in the job storage unit;

a display unit which displays job state information indicating an execution state of each of the jobs;

a storage unit which stores the job state information in plural languages; and a display control unit which reads from the storage unit the job state information in one or plural languages matching the languages extracted by the extracting unit, and displays on the display unit the read job state information in the one or plural languages, wherein the display control unit simultaneously displays job state information for a single job in both (1) a first language paired with the single job in the job storage unit and (2) in at least one additional second language paired with another job in the job storage unit, the first and at least one additional languages being different.

2. The image forming apparatus according to claim 1, wherein the display control unit reads from the storage unit the job state information in plural languages matching the languages extracted by the extracting unit, and displays on the display unit the job state information by changing over the read job state information in the plural languages.

3. The image forming apparatus according to claim 1, wherein the display control unit reads from the storage unit the job state information in plural languages matching the languages extracted by the extracting unit, and displays on the display unit through scrolling the read job state information in the plural languages.

4. The image forming apparatus according to claim 1, further comprising:

a default language setting unit which sets a default language in advance, wherein the display control unit reads from the storage unit the job state information in the default language, and displays the read job state information in the default language on the display unit, in addition to the job state information in the languages matching the languages extracted by the extracting unit.

5. The image forming apparatus according to claim 1, further comprising:

a group setting unit which collectively sets the plural languages as one group; and a representative language setting unit which sets a representative language among the plural languages set into one group by the group setting unit, wherein in a case where there has been a language matching a language set into one group by the group setting unit among the languages extracted by the extracting unit, the display control unit reads from the storage unit the job information in the representative language, and displays the read job information in the representative language on the display unit.

6. The image forming apparatus according to claim 1, further comprising:

a maximum number setting unit which sets a maximum number of languages to be used for displaying the job information on the display unit, wherein the display control unit reads from the storage unit the job information in the languages the number of which is equal to or less than the maximum number set by the maximum number setting unit, and displays the read job information in languages the number of which is equal to or less than the maximum number on the display unit.

7. The image forming apparatus according to claim 1, comprising:

a group setting unit which collectively sets plural languages as one group;

a representative language setting unit which sets a representative language among the plural languages set into one group by the group setting unit; and a maximum number setting unit which sets a maximum number of languages to be used for displaying the job information on the display unit, wherein in a case where the number of languages extracted by the extracting unit has been equal to or greater than the maximum number set by maximum number setting unit and there has been a language matching a language set into one group by the group setting unit among the languages extracted by the extracting unit, the display control unit reads from the storage unit the job information in the representative language and displays the read job information in the representative language on the display unit.

8. The image forming apparatus according to claim 1, further comprising:

a history holding unit which stores a history of the languages extracted by the extracting unit, wherein the display control unit reads from the storage unit the job information in a language whose frequency of use is high on the basis of the history stored in the history holding unit, and displays the read job information in the frequently used language on the display unit.

9. The image forming apparatus according to claim 8, wherein the display control unit displays a language whose frequency of use is high on the display unit by highlighting the display of the language based on the history stored in the history holding unit.

10. An image forming method, comprising:

storing job state information in plural languages in a storage unit;

storing in a job storage unit plural jobs being executed and on standby in association with languages used therefor;

extracting by an extracting unit languages associated with the jobs stored in the job storage unit; and reading from the storage unit the job state information in one or plural languages matching the languages extracted by the extracting unit, and displaying on the display unit the read job state information in the one or plural languages, wherein job state information for a single job is simultaneously displayed in both (1) a first language paired with the single job in the job storage unit and (2) in at least one additional language paired with another job in the job storage unit, the first and at least one additional languages being different.

11. A computer readable medium storing a program causing a computer to execute a display control process for displaying on a display unit job state information on plural jobs being executed and on standby stored in a storage unit of an image forming apparatus, the display control process comprising:

storing in a job storage unit the plural jobs being executed and on standby in association with languages used therefor;

storing in the storage unit the job state information in plural languages;

extracting languages associated with jobs stored in the job storage unit; and reading from the storage unit the job state information in one or plural languages matching the extracted languages, and displaying on the display unit the read job state information in the one or plural languages, wherein job state information for a single job is simultaneously displayed in both (1) a first language paired with the single job in the job storage unit and (2) in at least one additional language paired with another job in the job storage unit, the first and at least one additional languages being different.

* * * * *